United States Patent
Liu et al.

(10) Patent No.: US 7,034,893 B2
(45) Date of Patent: Apr. 25, 2006

(54) METHOD AND APPARATUS FOR RECEPTION OF TERRESTRIAL DIGITAL TELEVISION SIGNALS

(75) Inventors: Tianmin Liu, Laguna Niguel, CA (US); Randall B. Perlow, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 619 days.

(21) Appl. No.: 09/923,676

(22) Filed: Aug. 6, 2001

(65) Prior Publication Data

US 2002/0163593 A1 Nov. 7, 2002

Related U.S. Application Data

(60) Provisional application No. 60/280,159, filed on Mar. 30, 2001.

(51) Int. Cl.
 *H04N 5/44* (2006.01)
(52) U.S. Cl. ...................................... 348/614
(58) Field of Classification Search ............... 348/614, 348/611, 607, 706, 705, 725, 729, 731; 375/321, 375/347, 267; 455/132, 133, 138, 277.1, 455/277.2, 278.1, 279.1
See application file for complete search history.

(56) References Cited

U.S. PATENT DOCUMENTS

| | | | | |
|---|---|---|---|---|
| 3,999,182 A | * | 12/1976 | Moeller et al. | 342/372 |
| 5,159,707 A | * | 10/1992 | Mogi et al. | 455/134 |
| 5,313,660 A | * | 5/1994 | Lindenmeier et al. | 455/135 |

(Continued)

FOREIGN PATENT DOCUMENTS

EP 1 045 531 A2 10/2000

(Continued)

OTHER PUBLICATIONS

European Search Report Dec. 17, 2003 (Appln. No. EP 02 09 0129).

(Continued)

*Primary Examiner*—Paulos M. Natnael
(74) *Attorney, Agent, or Firm*—Christie, Parker & Hale, LLP (57) ABSTRACT

A digital television signal is intercepted by a plurality of antennas to produce a corresponding plurality of input signals. The antennas have different directionality so they can be combined in a way that reduces multipath echoes. In one embodiment, the antennas are arranged to operate in a diversity or scanned array mode. In another embodiment, the antennas are arranged to operate in a adaptive phased array mode. The input signals intercepted by the antenna are subjected to vestigial sideband (VSB) processing to produce a single VSB processed signal, which is decoded to form a display drive signal. A plurality of input signals in a VSB receiver having a plurality of antennas with different directionality are evaluated to determine how the input signals should be combined to reduce multipath echoes. The quality of the input signals from the antennas is evaluated at one of a number of different points in the VSB receiver, such as at the outputs of the antennas, the outputs of the VSB processors, or the output of the forward error correction (FEC) decoder. Within the VSB processors themselves, the quality of the input signals can be evaluated at a number of different points, including the outputs at the front end, the outputs at the back end, or inside the back end the outputs at the feed forward equalizer.

5 Claims, 8 Drawing Sheets

U.S. PATENT DOCUMENTS

| | | | | |
|---|---|---|---|---|
| 5,335,010 | A | * | 8/1994 | Lindemeier et al. ......... 348/706 |
| 5,528,581 | A | * | 6/1996 | De Bot ....................... 370/203 |
| 5,802,461 | A | * | 9/1998 | Gatherer ..................... 455/204 |
| 5,818,389 | A | * | 10/1998 | Lazar ......................... 342/383 |
| 5,818,543 | A | * | 10/1998 | Lee ............................ 348/725 |
| 6,115,419 | A | | 9/2000 | Meehan |
| 6,553,239 | B1 | * | 4/2003 | Langston .................... 343/778 |
| 6,577,353 | B1 | * | 6/2003 | Welles et al. ............... 348/706 |
| 6,603,961 | B1 | * | 8/2003 | Kuroda ....................... 455/133 |
| 6,693,889 | B1 | * | 2/2004 | Abe et al. ................... 370/342 |
| 6,707,861 | B1 | * | 3/2004 | Stewart ...................... 375/321 |

FOREIGN PATENT DOCUMENTS

| | | |
|---|---|---|
| JP | 11041196 | 12/1999 |
| WO | WO 01/19075 A2 | 3/2001 |

OTHER PUBLICATIONS

Ishikawa, et al., *Selection Diversity with Decision Feedback Equalizer*, 2-1-15, KDD R&D, Laboratories, Saitama, Japan, IEEE 1994, pp. 962-966.

* cited by examiner

METHOD AND APPARATUS FOR RECEPTION OF TERRESTRIAL DIGITAL TELEVISION SIGNALS

CROSS-REFERENCE TO RELATED APPLICATION

This application is a regular patent application based on provisional patent application Ser. No. 60/280,159, filed on Mar. 30, 2001, the disclosure of which is incorporated fully herein. Applicants claim the benefit of the filing date of this provisional application.

BACKGROUND OF THE INVENTION

This invention relates to the reception of radio frequency signals, and more particularly, to the reception of terrestrial digital television signals.

Terrestrial digital television signals are subject to multipath effects due to the ionosphere the ground, and walls and objects inside buildings. During reception of a terrestrial digital television signal, the multipath effects manifest themselves as echoes of the transmitted signal. In the receiver, these echoes have the effect of signal noise. In the United States, high-definition digital television is defined by the Advanced Television System Committee (ATSC) A-53 specification, which is incorporated herein by reference. This standard was designed with a fixed outdoor antenna in mind. In a mobile, portable, or indoor environment, the echoes caused by multipath effects strongly impact the quality of the received television signal.

SUMMARY OF THE INVENTION

According to the invention, a digital television signal is intercepted by a plurality of antennas to produce a corresponding plurality of input signals. The antennas have different directionality so they can be combined in a way that reduces multipath echoes. In one embodiment, the antennas are arranged to operate in a diversity mode. In another embodiment, the antennas are arranged to operate in a adaptive phased array mode. The elements of the phased array themselves have the same directionality; but considered as a unit when the phase angle of the array is varied they have different directionality. The input signals intercepted by the antenna are subjected to vestigial sideband (VSB) processing to produce a single VSB processed signal, which is decoded to form a display drive signal.

In one aspect of the invention, a plurality of input signals in a VSB receiver having a plurality of antennas with different directionality are evaluated to determine how the input signals should be combined to reduce multipath echoes. The quality of the input signals from the antennas is evaluated at one of a number of different points in the VSB receiver, such as at the outputs of the antennas, the outputs of the VSB processors, or the output of the forward error correction (FEC) decoder. Within the VSB processors themselves, the quality of the input signals can be evaluated at a number of different points, including the outputs at the front end, the outputs at the back end, or inside the back end the outputs at the feed forward equalizer.

In one embodiment of the invention, one antenna is used in a scanning mode to evaluate the input signals from the other antennas and select the best input signal. If the quality of the input signal from the scanning antenna becomes better than the other input signals, their roles are switched.

In another embodiment of the invention in which the antennas comprise a phased array. The directionality of the phased array is swept during acquisition to find the angle that produces the highest quality input signal. After acquisition, the phased array is operated at that angle as the dead center setting and moved from time to time to an angle slightly off dead center. If the quality of the off-center input signal becomes better than the quality of the signal from the dead center setting, the angle of the phased array is adjusted to the off-center position.

A feature of the invention is the use of a pair of VSB receivers in a two channel mode to form a picture-in-picture (PIP) television display or other arrangement that uses two channels such as watch and record. When not in the two channel mode, the receiver having the best output signal quality is used to drive the television display as previously described.

Another feature of the invention is the use of a single analog-to-digital (A/D) converter to process all the input signals before application to the VSB processors. These input signals are down-converted for digitization by the A/D converter and sorted out in the VSB processors.

BRIEF DESCRIPTION OF THE DRAWINGS

The features of specific embodiments of the best mode contemplated of carrying out the invention are illustrated in the drawings, in which.

DETAILED DESCRIPTION OF THE SPECIFIC EMBODIMENTS

Figures 1, 2:
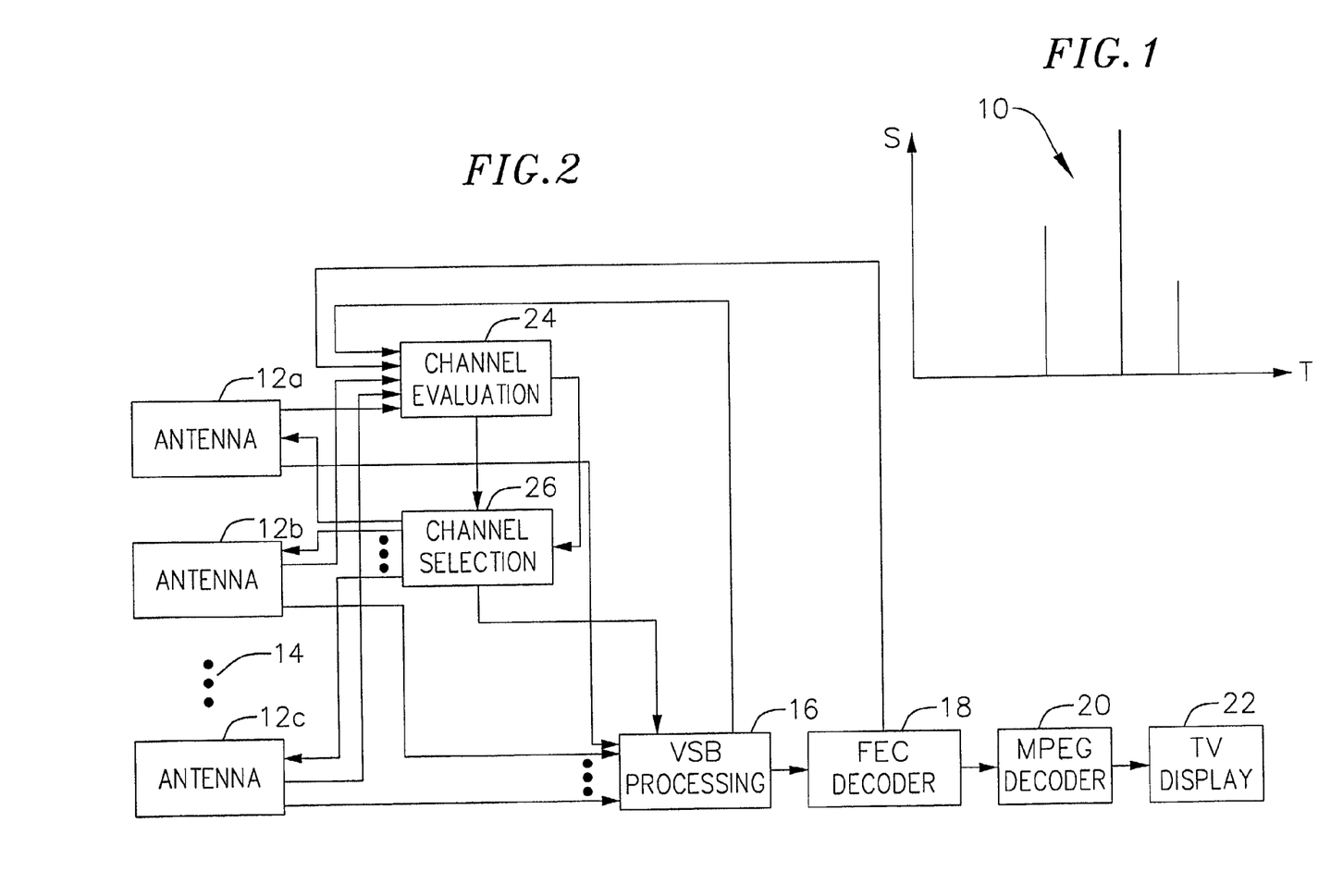
FIG. 1 is a diagram showing typical echoes of a terrestrial television signal intercepted by a VSB receiver in the time domain.
FIG. 2 is a schematic block diagram of a generic representation of a number of different embodiments of the invention.

FIG. 1 illustrates in the time domain a typical terrestrial digital television signal intercepted by a VSB receiver. The abscissa represents time and the ordinate represents power. Due to multipath effects, a single television signal might be intercepted by a receiver as a plurality of echoes, such as echos 10a, 10b, 10c, occurring at different times. When the television signal is digitized, these echos manifest themselves as noise received on the television signal.

In FIG. 2, a digital terrestrial television receiver has a plurality of antennas 12a, 12b, . . . 12c. As represented by dots 14, any number of further antennas could be employed between antennas 12b and 12c. Antennas 12a, 12b, . . . 12c have different directionality.

In one embodiment, antennas 12a, 12b, . . . 12c each comprise a single fixed antenna element pointing in a different direction (different directionality) so together they cover the entire field of view from which the television signal may be intercepted with some overlap. The individual antennas are spaced apart by more than a wave length so no interference occurs. If the field of view is 360°, for example, and there are three antennas, the antennas would be spaced 120° from each other with some overlap, each antenna would have more than a 120° field of view, and the antennas would be switched so the input signal only comes from one antenna. In this embodiment, antennas 12a, 12b, . . . 12c function as a switched diversity antenna.

In another embodiment, antennas 12a, 12b, . . . 12c comprise the elements of a phased array. Although the individual elements of the phased array point in the same direction, the array as a unit points in different directions (different directionality) as the array scans or jumps through the field of view. In one case, the phased array assumes one of a discrete number of angular positions, depending on the direction from which the signal impinges on the receiver. As the direction of the intercepted signal changes, the array switches (jumps) from one angular position to another to acquired the best signal. (This is similar to a switched diversity antenna.) In another case, the phased array is adaptive in that its angular position tracks the changes in incoming signal direction. The adaptive array can adjust itself to acquire the best signal and/or reject an undesirable signal.

In yet another embodiment, antennas 12a, 12b, . . . 12c combine the characteristics of a diversity antenna and a adaptive phased array. Each of antennas 12a, 12b, . . . 12c is a phased array that covers a different field of view. The fields of view are scanned, however, rather than being continuously covered, as in the case of a diversity antenna.

includes equalization and demodulation of the input signals After VSB processing, the input signals are subjected to forward error correction (FEC) in an FEC decoder 18. After FEC processing, the resulting signal is coupled to an MPEG decoder 20. The MPEG decoded signal is used to drive a TV display 22. As represented by a block 24, a channel evaluation is undertaken to make a channel selection, as represented by a block 26. The channel evaluation and channel selection preferably take place on a line by line (833 symbols in VSB) or frame by frame (313 lines) basis. The criteria for evaluating the channels and making the selection are discussed below. As represented by the arrows entering block 24, the channel evaluation can take place at a number of points in the receiver, such as where the antenna input signals feed into the VSB processing circuitry, at FEC decoder 18, or at one or more locations in the VSB processing circuitry. The channel selection function of block 26 could control the selection of input signals from antennas 12a, 12b, . . . 12c, as represented by the arrows from block 26 to antennas 12a, 12b, . . . 12c, or selection of the antenna input signals at different points within the VSB processing, as represented by the arrow from block 26 to block 16.

Channel evaluation is performed by comparing one or more criteria of the signals received by antennas 12a, 12b, . . . 12c (or a threshold value) at one of a number of points in the receiver channel. Based on these criteria, channel selection could comprise selecting one channel to the exclusion of the other channels or combining the input signals from the channels in a way that produces the best signal at the input of MPEG decoder 18. Assuming selection of one of two channels, typical criteria for determining the best signal are the following:

$$SNR = \frac{\text{Total signal energy}}{\text{Total noise plus interference energy}} = \frac{\sum (\text{slicer output level})}{\sum (\text{difference between slicer input and output})}$$

$$SMS = \sum (\text{mean of main signal} - \text{main signal})^2$$

$$FFE = \text{Total energy of } FFE \text{ coefficients} = \sum_{i=1}^{N} (FFE coefficient)_i^2; N = \text{number of coefficients}$$

$$DFE = \text{Total energy of } DFE \text{ coefficients} = \sum_{i=1}^{M} (DFE coefficients)_i^2; M = \text{number of } DFE \text{ coefficients}$$

$$SER = \text{Symbol error rate} = \frac{\sum (\text{symbols in error})}{\sum \text{symbols}}$$

With reference to FIG. 1, it is usually preferable that the selected antenna intercept only one of echos 10a, 10b, 10c. It is not always the strongest echo that provides the best input signal from antennas 12a, 12b, . . . 12c. There are sometimes other important considerations such as the ability of the selected input signal to drive the equalizers in the VSB processors to a rapid and error free steady state condition or to reject a strong secondary echo. In any case, the beams of the antenna are selected to produce the overall best input signal.

Antennas 12a, 12b, . . . 12c are connected to RF amplifiers, filters, tuners and IF down converters (not shown). As a result, respective IF antenna input signals are derived. These antenna input signals are subjected to VSB processing, as represented by a block 16. The VSB processing $P_1 = [SNR, SNR_1, FFE_1, DFE_1, SMS_1, SER_1, SER, FEC_1]$ $P_2 = [SNR, SNR_2, FFE_2, DFE_2, SMS_2, SER_2 SER, FEC_2]$, where the subscripts 1 or 2 refer to channel 1 or 2 in FIG. 1.

$W_1 = [A_1, B_1, C_1, D_1, E_1, F_1, G_1, H_1]$; $W_2 = [A_2, B_2, C_2, D_2, E_2, F_2, G_2, H_2]$, where the components of $W_1$ and $W_2$ are numerical weighting factors Based on the above criteria, the algorithm that is applied to make the channel selection in the diversity or scanned array mode is as follows:

$$\mu_1 = \frac{\alpha_i P_1 \cdot W_1^T}{\alpha_1 P_1 \cdot W_1^T + \alpha_2 P_2 \cdot W_2^T}; \mu_2 = \frac{\alpha_2 P_2 \cdot W_2^T}{\alpha_1 P_1 \cdot W_1^T + \alpha_2 P_2 \cdot W_2^T}$$

In the diversity mode, operated so the channels switch from one antenna to the other rather than combining the signals from both antennas, the algorithm is:

select input a if $\mu_1 > \mu_2$ otherwise select b.
select input b if $\mu_2 > \mu_1$; otherwise select a.

In the above algorithm, the subscript "1" designates criteria from one channel, the subscript "2" designates criteria from the other channel, and no subscript designates criteria from a combination of both channels. $SNR_1$ is derived from slicer $112a$, $SNR_2$ is derived from slicer $112b$, and SNR is derived from slicer $122$. $P_1$ is a function of the criteria of channel 1 and $P_2$ is a function of the criteria of channel 2. There are weighting factors [A, B, C , . . . G] corresponding to the respective criteria. $W_1$ and $W_2$ represent these weighting factors as a group. P×W is a vector representing the products of the criteria and the weighting factors. $\alpha$ is a weighting factor applied to the vector P×W as a whole. Thus, the algorithm that selects the best signal is shaped by the weighting factors W and $\alpha$, which are determined by the system designer. A preferred principle for selecting antennas under many conditions is to maximize the SNR and minimize the SER and possibly one of more of the other criteria. In summary, depending upon the chosen algorithm, the best channel is selected based on one or more of the criteria set forth above.

Figure 3:
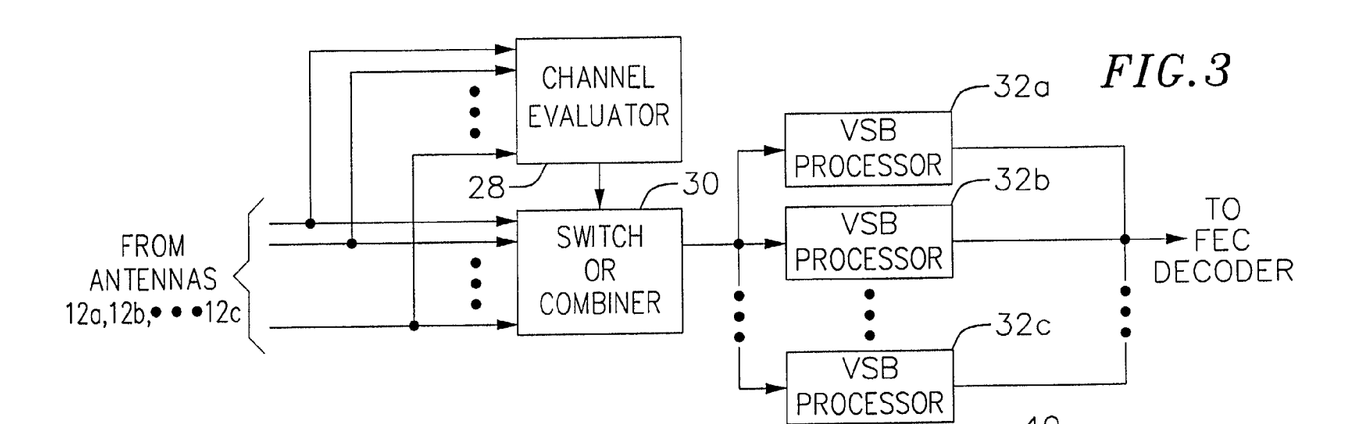
FIGS. 3 through 6 are schematic block diagrams illustrating different points in a VSB receiver where antenna input signals can be combined.

In the embodiment of FIG. 3, the channel evaluation and antenna selection take place at the output of antennas $12a$, $12b$, . . . $12c$, i.e., before VSB processing and after processing by the RF amplifiers, filters, tuners and IF down converters. The outputs from antennas $12a$, $12b$, . . . $12c$ are connected to channel evaluator 28 and to a switch or combiner 30. As described above, channel evaluator 28 controls switch or combiner 30 to switch or combine the output signals from antennas $12a$, $12b$, . . . $12c$ in a manner that creates a high quality signal that is coupled to VSB processors $32a$, $32b$, . . . $32c$. The output of the selected VSB processor 32 is coupled to FEC decoder 18 (FIG. 2). Even if only one antenna input is used, one VSB processor is provided for each antenna input signal so there is no interruption in the selected input signal as it is applied to FEC decoder 18. Thus, the old VSB processor furnishes a signal until the new VSB processor is switched into the channel.

Figure 4:
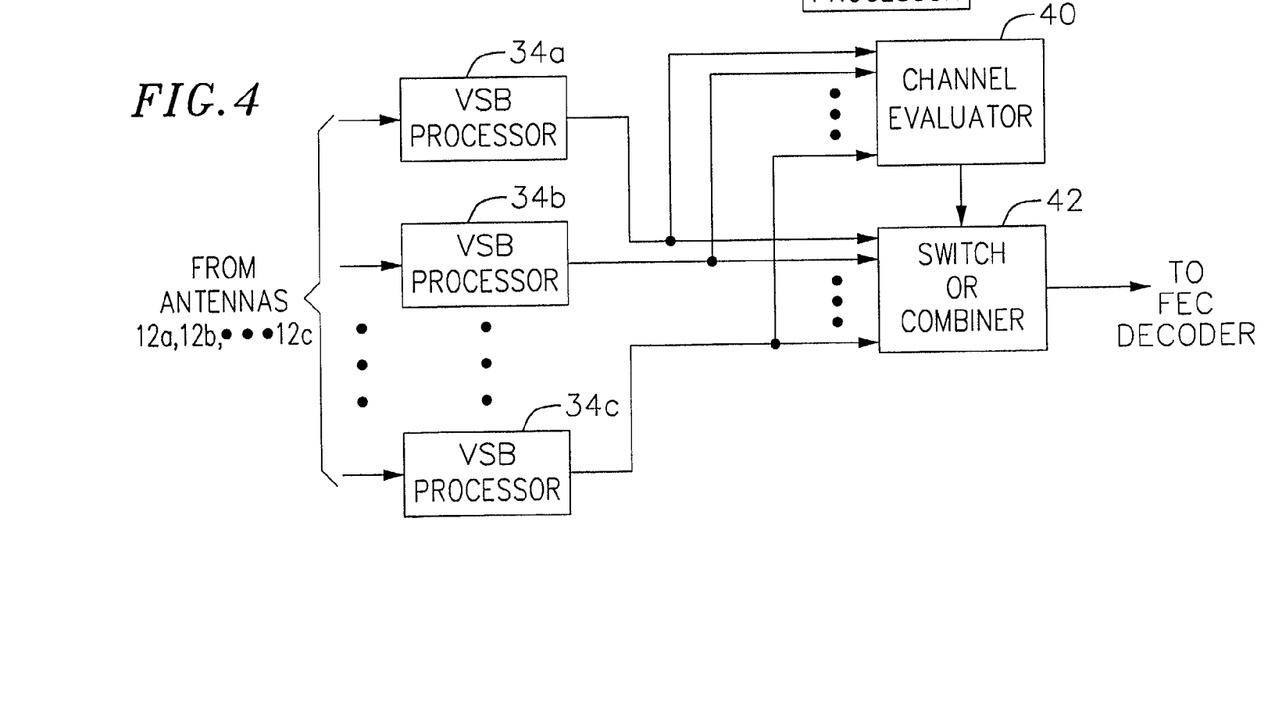

In the embodiment of FIG. 4, the channel evaluation and antenna selection take place after VSB processing. The input signals from antennas $12a$, $12b$, . . . $12c$ are coupled by VSB processors $34a$, $34b$, . . . $34c$ to a switch or combiner 42 and to a channel evaluator 40. The output of switch or combiner 42 is coupled to FEC decoder 18 (FIG. 2). As described above, channel evaluator 40 controls switch or combiner 30 to switch or combine the output signals from antennas $12a$, $12b$, . . . $12c$ in a manner that creates a high quality signal that is coupled to VSB processors $34a$, $34b$, . . . $34c$.

Figure 5:
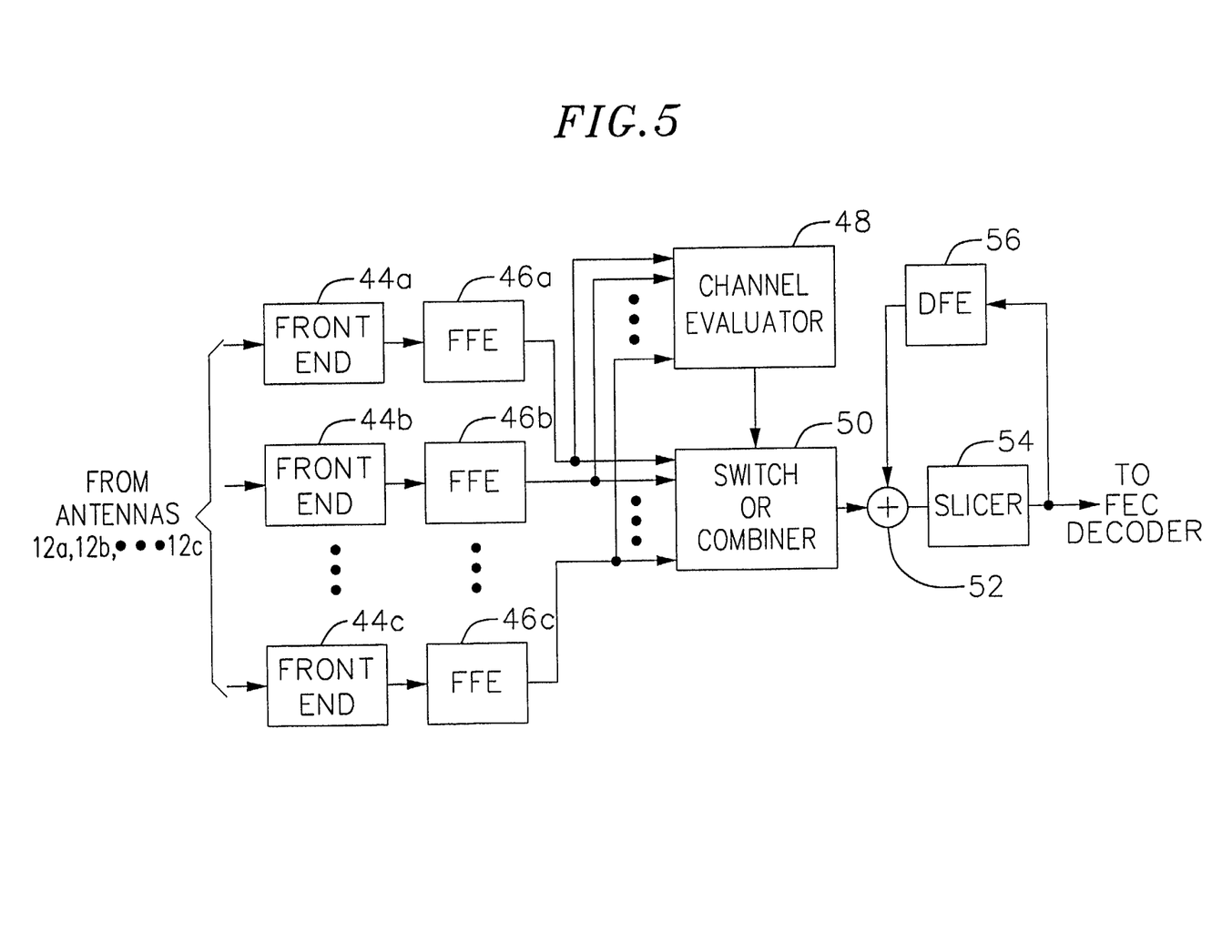

In the embodiment of FIG. 5, the channel evaluation and antenna selection take place inside the equalizer section of the VSB processors (see FIG. 4) instead of at their inputs or outputs. The VSB processors have front ends $44a$, $44b$ . . . $44c$, which are coupled to feed forward equalizers (FFE) $46a$, $46b$ . . . $46c$. The outputs of FFEs $46a$, $46b$, . . . $46c$ are coupled to a channel evaluator 48 and a switch or combiner 50. Switch or combiner 50 is coupled to a summing junction 52. The output of summing junction 52 is coupled to the input of a slicer (decision circuit) 54. The output of slicer 54, which serves as the output of the VSB processor, is coupled to the input of a decision feed back equalizer (DFE) 56. The output of DFE 56 is coupled to the other input of summing junction 52. Thus, the channel evaluation and selection are made in the equalizer of the VSB processors between multiple FFE sections and a single slicer/DFE section. As described above, channel evaluator 48 controls switch or combiner 30 to switch or combine the output signals from antennas $12a$, $12b$, . . . $12c$ in a manner that creates a high quality signal that is coupled to the FEC decoder.

Figure 6:
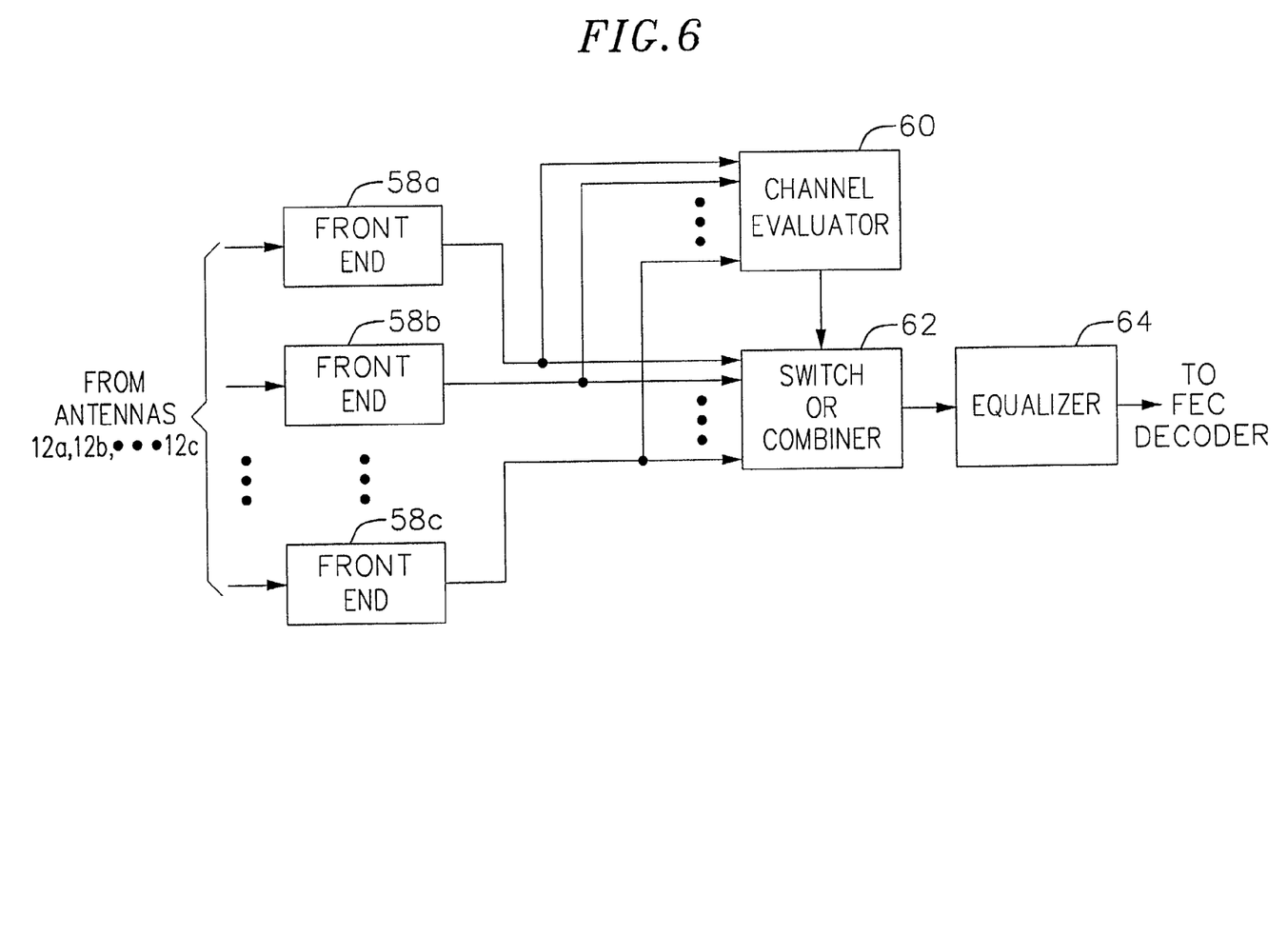

In the embodiment of FIG. 6, the channel evaluation and antenna selection take place inside the VSB processing unit at the input of an equalizer section comprising a single FFE and a single slicer/DFE of the type shown in FIG. 5. Antennas $10a$, $10b$, . . . $10c$ are coupled to front ends $58a$, $58b$ . . . $58c$ of the VSB processing unit. The outputs of front ends $58a$, $58b$, . . . $58c$ are coupled to a channel evaluator 60 and a switch or combiner 62. As described above, channel evaluator 60 controls switch or combiner 30 to switch or combine the output signals from antennas $12a$, $12b$, . . . $12c$ in a manner that creates a high quality signal that is coupled to equalizer 64.

Switch or combiners 30, 42, 50, and 60 can be regarded as producing a weighted combination of the input signals. The weighting factors are calculated on a line by line or frame by frame basis depending on the criteria and how they are used (this is not the same weighting factor discussed above in connection with the criteria for determining the best channel). The weighting factor of each input signal can vary from zero to one. If the weighting factor of all except one of the input signals is zero, the result is a switching function, i.e., only one input signal is transmitted to the rest of the receiver. If all the weighting factors are non-zero, the result is a blending function, i.e., all the input signals are transmitted to the rest of the receiver.

Figure 7:
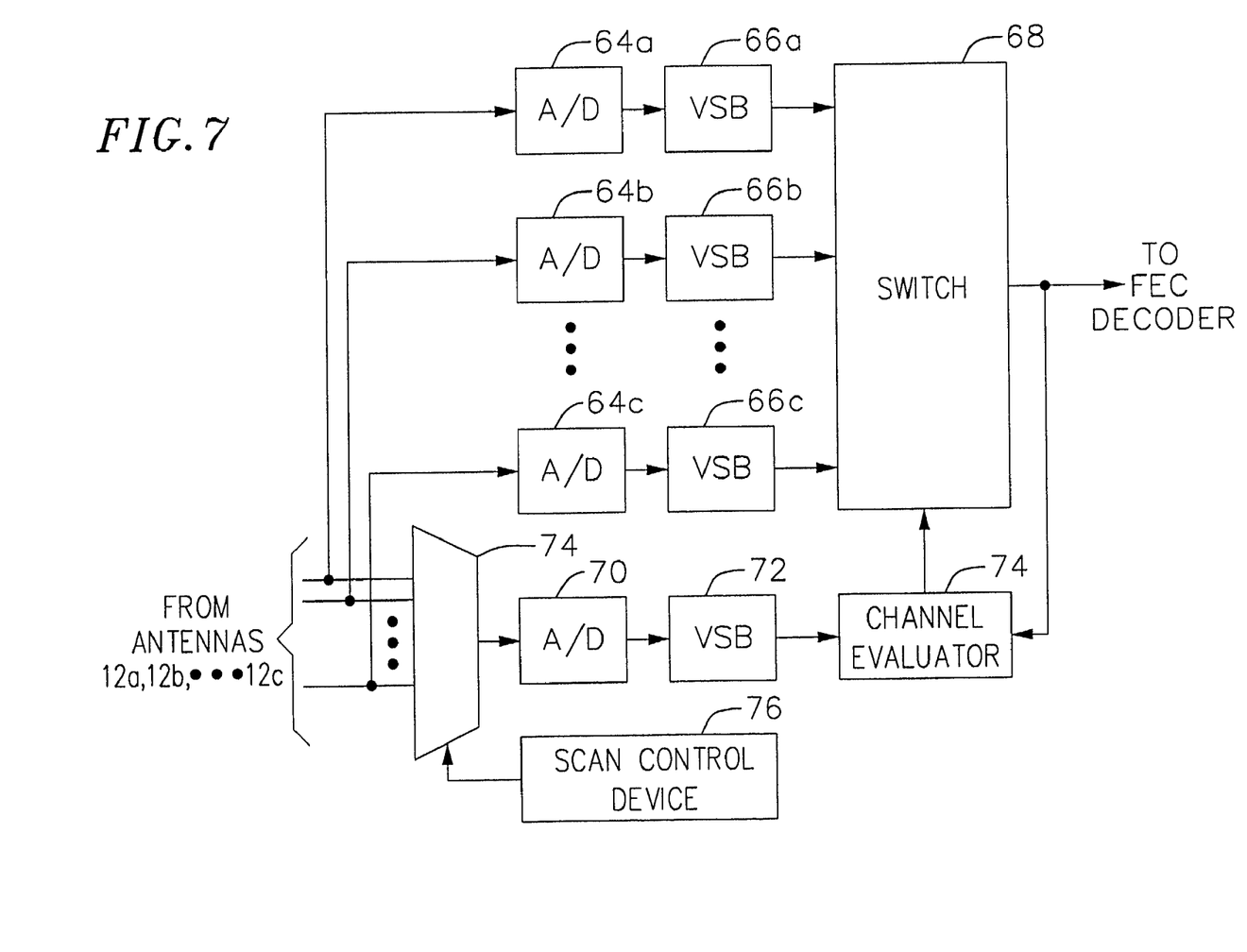
FIG. 7 is a schematic block diagram of a multi-antenna VSB receiver in which one antenna scans the field of view to select the antenna input signal having the highest quality.

In the embodiment of FIG. 7, the channels are scanned to select the antenna input signal to be used in the receiver. The input signals from antennas $12a$, $12b$, . . . $12c$ are coupled by respective A/D converters $64a$, $64b$ . . . $64c$ to respective VSB processors $66a$, $66b$ . . . $66c$, which are connected to a switch 68. The scanning is performed by an additional A/D converter 70 connected to an additional VSB processor 72, so that there is no discontinuity during change over from one channel to the other. To perform the scanning function, the antenna input signals are applied to respective inputs of a switching MUX 74. The output of MUX 74 is coupled to A/D converter 70. MUX 74 is controlled by a scan control device 76 responsive to a search algorithm so that only one of the input signals from antennas $12a$, $12b$, . . . $12c$ is applied to A/D converter 70 at a time. The output of VSB processor 72 and the output of switch 68 are compared in a channel evaluator 74 using the channel quality criteria described above. When the quality of the scanned channel as represented by the output signal from VSB processor 72 is higher than the signal being used from switch 68, channel evaluator 74 substitutes the output signal from VSB processor 72 for the output signal from VSB processor $66a$, $66b$; . . . $66c$. As a result of the scanning, the highest quality signal is always coupled to FEC decoder 18.

Figure 8:
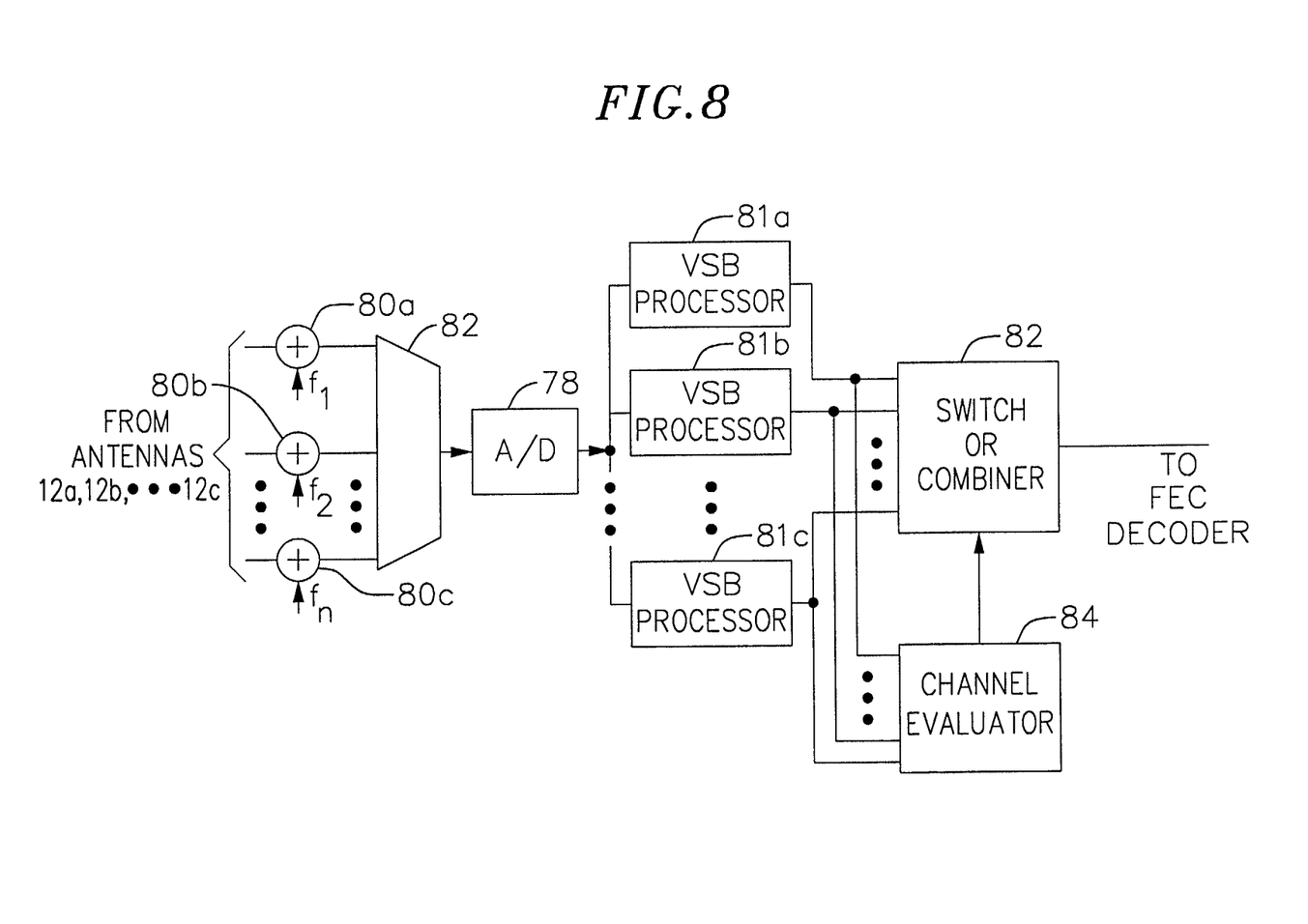
FIG. 8 is a schematic block diagram of a multi-antenna VSB receiver in which a single A/D converter is used to furnish input signals to a plurality of VSB processors.

In the embodiment of FIG. 8, a single A/D converter 78 is shared by all the input signals from antennas $12a$, $12b$, . . . $12c$ by using frequency division multiplex to downshift all the antenna input signals to closely spaced IF frequencies and processing the resulting FDM signal. Specifically, the antenna input signals are applied to one input of mixers 80a, 80b . . . 80c, respectively. Different frequencies $f_1, f_2 \ldots f_n$ from local oscillators (not shown) are applied to the other inputs of mixers 80a to 80c, respectively. The values of frequencies $f_1, f_2 \ldots f_n$ are selected to produce the closely spaced IF frequencies. The outputs of mixers 80a to 80c are coupled to the inputs of a MUX 82 that combines these outputs. The output from A/D converter 78 is separated by VSB processors 80a, 80b . . . 80c and coupled to the inputs of a switch 82, and the inputs of a channel evaluator 84. Channel evaluator 84 selects the output of one of VSB processors 81a, 81b, . . . 81c for application to the FEC decoder. The arrangement of FIG. 8 is similar to the arrangement of FIG. 4 except for the use of a single A/D converter.

Figure 9:
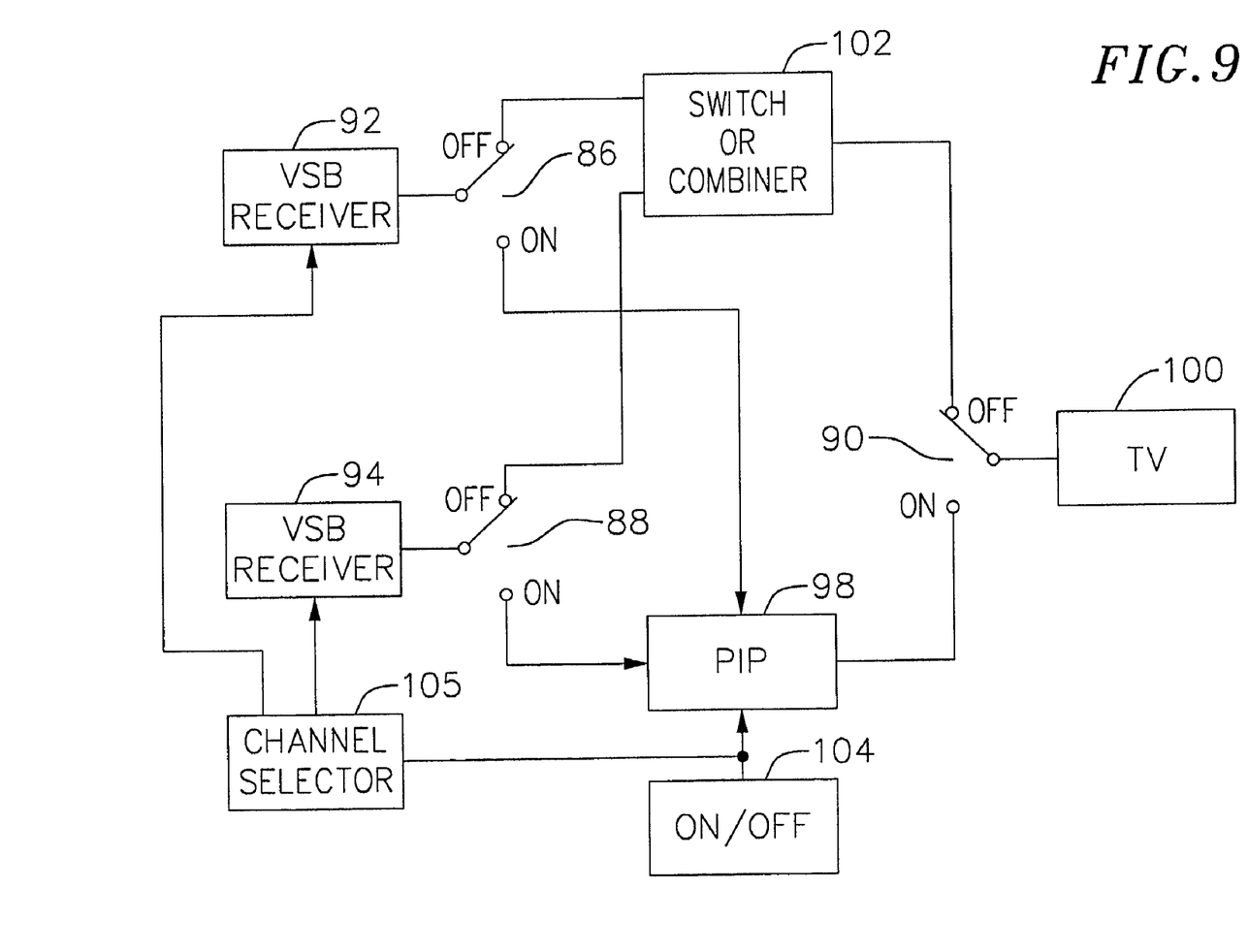
FIG. 9 is a schematic block diagram of two VSB receivers, illustrating how these receivers can be used, either in a two channel mode or in a diversity or scanned array mode.

In the embodiment of FIG. 9, a pair of VSB receivers are used in two alternative modes of operation. In the first (two channel ) mode, the tuner of one receiver is used to generate a picture in picture (PIP) display and the tuner of the other receiver is used to simultaneously generate a full-screen background display. In this mode, the tuners are tuned to different frequencies so as to receive two different television channels. As a result, in the two channel mode, the programs from two television channels can be displayed at the same time in the conventional manner. In the second (diversity or scanned array) mode, the tuners of the receivers are used alternatively in a diversity arrangement or a combined signal arrangement, as described in the previously discussed embodiments. In this mode, the tuners are tuned to the same frequency so as to receive the same television channel. The change in modes is accomplished by switches 86, 88 and 90. When switches 86, 88, and 90 are in one state (i.e., ON), this embodiment is operating in the two channel mode. When switches 86, 88, and 90 are in the other state (i.e., OFF), this embodiment is operating in the diversity or scanned or array mode. In the ON state, VSB receivers 92 and 94 are coupled to the respective inputs of a PIP chip 98. The output of PIP chip 98 is applied to the beam control input of a television (TV) display 100. An ON/OFF switch 104 actuates a channel selector 105 and initiates the two channel function. Channel selector 105 is coupled to the tuners in VSB receivers 92 and 94. When switch 104 is in the ON state, two separate channel commands are sent to the tuners by channel selector 105; switches 86, 88, and 90 are also in the ON state and the two television channels are isolated from each other so both signals paths can be processed separately. When switch 104 is in the OFF state, one channel command is sent to the tuners by channel selector 105; switches 90, 92, and 94 are also in the OFF state. In the OFF state, VSB receivers 92 and 94 are both coupled to a switch or combiner 102. The output of switch or combiner 102 is coupled by switch 90 in the OFF state to TV display 100. In summary, the tuners of VSB receivers 92 and 94 are used to generate a PIP display when the user is operating the television receiver in the two channel mode. The tuners of VSB receivers 92 and 94 are used to generate a high-quality input signal for TV display 100 based upon antenna selection when the user is not operating the television receiver in a two channel mode. Instead of a PIP function the two tuners could permit the user simultaneously to watch one channel and record another channel.

Figure 10:
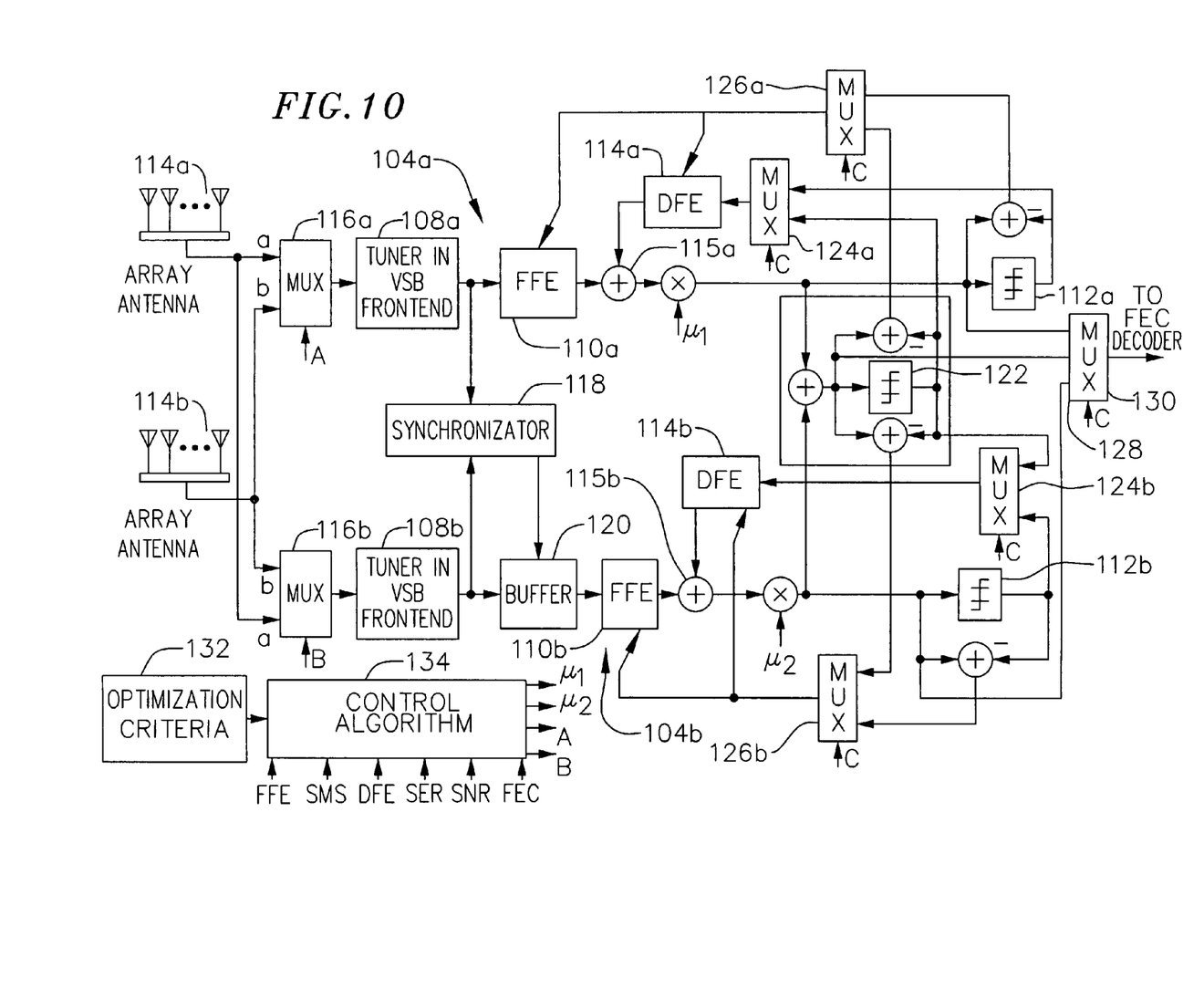
FIG. 10 is a schematic block diagram of the specific implementation of the dual-mode embodiment of FIG. 9.

FIG. 10 shows the receiver of FIG. 9 in more detail. Antennas 114a, 114b could comprise arrays or a single element that cover different fields of view. Signal path 104a has a tuner in VSB front end 108a and an equalizer comprising FFE 110a, a summing junction 115a, a slicer 112a, and a DFE 114a. Similarly, signal path 104b has a tuner in VSB front end 108b and an equalizer comprising FFE 110b, a summing junction 115b, a slicer 112b, and a DFE 114b. In the two channel mode, channels 104a and 104b are essentially isolated from each other. In the scanned array mode, slicers 112a, 112b of channels 104a, 104b are disabled and a cross-coupling slicer 122 is enabled. Antennas 114a and 114b are coupled by MUXs 116a, 116b, respectively, to the tuners in VSB front ends 108a, 108b, respectively. Signals A and B determine which of antennas 114a, 114b is/are connected to the tuners in VSB front end 108a, 108b. In the diversity or scanned array mode, the tuners in VSB front ends 108a, 108b are set to the same channel, MUX 116a connects antenna 114a to the input of the tuner in VSB front end 108a, and MUX 116b connects antenna 114b to the input of the tuner in VSB front end 108b. In the two channel mode, the tuners in VSB front ends 108a, 108b are set respectively to the two channels being received. The two channel mode takes advantage of the combined field of view of antennas 114a, 114b. Depending upon the direction from which the two channels impinge upon these antennas, one antenna or the other or both antennas is/are connected by MUXs 116a, 116b to the inputs of the tuners in VSB front ends 108a, 108b. In the same way as the diversity or scanned array mode, the best signal for each signal path is determined as a basis for the connectivity of MUXs 116a, 116b. For example, if the tuner in VSB front end 108a is tuned to channel 1 and the best signal from channel 1 is intercepted by antenna 114b, MUX 116b directs antenna 114b to the tuner in VSB front end 108a; if the tuner in VSB front end 108b is tuned to channel 2 and the best signal from channel 2 is also intercepted by antenna 114b, MUX 116b also directs antenna 114b to the tuner in VSB front end 108b. Similarly, if the tuner in VSB front end 108a is tuned to channel 1 and the best signal from channel 1 is intercepted by antenna 114a, MUX 116a directs antenna 114a to the tuner in VSB front end 108a; if the tuner in VSB front end 108b is tuned to channel 2 and the best signal from channel 2 is also intercepted by antenna 114a, MUX 116a also directs antenna 114a to the tuner in VSB front end 108b. If channel 1 is received better from one antenna and channel 2 is received better from the other antenna, MUX 116a directs the one antenna to the tuner in VSB front end 108a and the other antenna to the tuner in VSB front end 108b. The outputs of the tuners in VSB front ends 108a, 108b are connected to a synchronizer 118 to bring the MPEG frames of both channels into synchronism. For this purpose, a buffer 120 stores part of the MPEG frame transmitted on one channel. Synchronizer 118 senses the offset between the MPEG frames on channels 104a and 104b and stores this offset part in buffer 120.

A signal C controls MUXs 124a, 124b, MUXs 126a, 126b, and MUX 130 to switch the from one state in the two channel mode and to the other state in the diversity or scanned array mode. In the two channel mode slicers 112a and 112b are operative. In the diversity or scanned array mode, slicer 122 is operative. Specifically, in the two channel mode the outputs of slicer 112a, 112b are coupled by DFEs 114a, 114b to summing junctions 115a, 115b for combination with the outputs of FFEs 110A, 110B; the error signals from slicers 112a, 112b set the coefficients of FFEs 110a, 110b and DFEs 114a, 114b; and the inputs to slicers 112a, 112b are coupled by MUX 130 to the FEC decoder. In this mode, slicer 122 is not operative because MUX 130 blocks transmission from slicer 122. In the diversity or scanned array mode, the output of slicer 122 is coupled by DFEs 114a, 114b to summing junctions 115a, 115b for combination with the outputs of FFEs 110a, 110b; the error signals from slicer 122 set the coefficients of FFEs 110a, 110b and DFEs 114a, 114b; and the input of slicer 122 is coupled by MUX 130 to the FEC decoder. In this mode, slicers 112a, 112b are not operative because MUX 130 blocks transmission from slicers 112a, 112b. Multiplying factors μ1, μ2 are introduced between summing junctions 115a, 115b and slicers 112a, 112b to weight the contributions of the channels to the output signal sent to the FEC decoder. These multiplying factors could vary between zero and one depending upon the quality of the channels.

In both the diversity or scanned array mode and the two channel mode, the operation is dynamic, i.e., signals A and B and weighting factors $\mu_1$ and $\mu_2$ change as the conditions, such as the position of the televion receiver, change. Depending on the algorithm used, the described receiver can operate adaptively in the sense that the receiver always adjusts the antenna signals to track the best signal.

In one simple implementation of FIG. 10, antennas 114a, 114b are each single elements and multiplying factors $\mu_1$ and $\mu_2$ are either one or zero. As a result, the signals derived from antennas 114a and 114b are switched on and off in channels 104a and 104b to derive the signal fed by MUX 130 to the FEC decoder. In other embodiments multiplying factors $\mu_1$ and $\mu_2$ can vary in weight to combine the signals derived from antennas 114a and 114b.

As represented by a block 132, optimization criteria are derived for both the two channel mode and the diversity or scanned array mode. As represented by a block 134, an algorithm derives control parameters from these criteria to select antennas 114a, 114b to feed channels 104a, 104b in the two channel mode under control of signals A and B and to derive multiplying factors μ1, μ2 in the diversity or scanned array mode. The optimization criteria can be derived at different locations of channels 104a, 104b in accordance with the embodiments of FIGS. 2 to 6.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention. For example the configuration of FIG. 10 could be expanded to three of more antennas and channels.

What is claimed is:

1. A receiver for intercepting a modulated radio signal in a first mode or and second mode, the receiver comprising:
    first and second antennas having different directionality to produce corresponding first and second input signals;
    means for evaluating the quality of the first and second input signals;
    first and second signal processors connected to the one or both of the first and second antennas for demodulating the respective first and second input signals;
    a tuner in each of the first and second signal processors, the tuners being set to different frequencies in the first mode and the same frequency in the second mode;
    a utilization circuit;
    means in the first mode for connecting both of the signal processors to the utilization circuit irrespective of the quality of the input signals; and
    means responsive to the evaluating means in the second mode for connecting one of the signal processors to the utilization circuit based on the quality of the input signals, the first and second modes operating alternatively.

2. The receiver of claim 1, in which the connecting means responsive to the evaluating means in the second mode comprises a switch.

3. The receiver of claim 2, in which the utilization circuit has forward error correction means.

4. The receiver of claim 2, additionally comprising an equalizer and a signal slicer in each signal processor.

5. The receiver of claim 1, additionally comprising an equalizer and a signal slicer in each signal processor.

* * * * *